C. P. SKUBLIN.
DIFFERENTIAL DRIVE FOR MOTOR VEHICLES.
APPLICATION FILED JAN. 24, 1921.
1,408,835.
Patented Mar. 7, 1922.
2 SHEETS—SHEET 1.
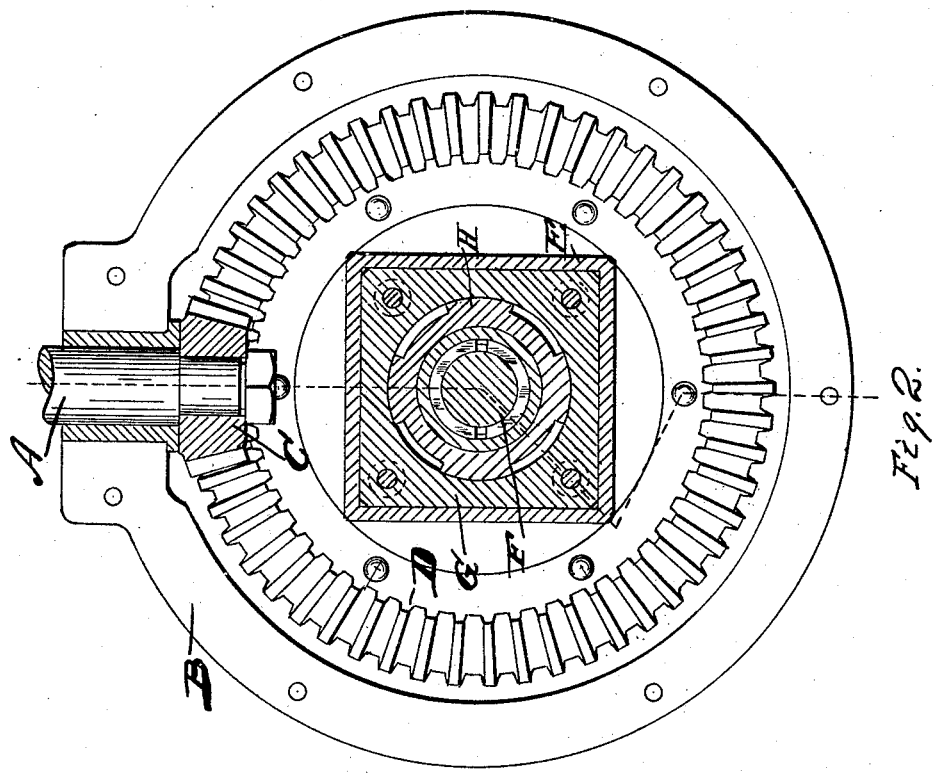
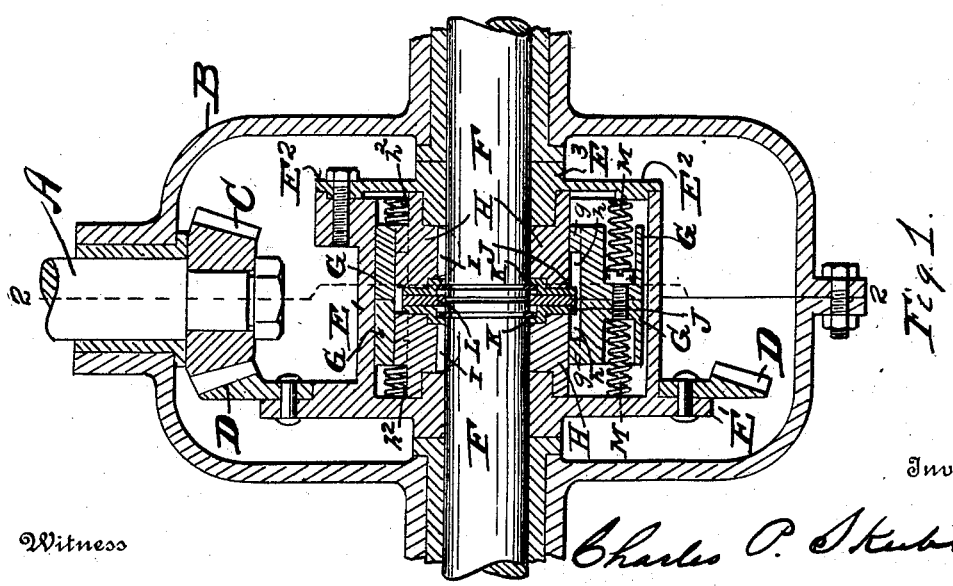
Witness
Inventor
Charles P. Skublin
By J. E. Thomas, Attorney C. P. SKUBLIN.
DIFFERENTIAL DRIVE FOR MOTOR VEHICLES.
APPLICATION FILED JAN. 24, 1921.

1,408,835.

Patented Mar. 7, 1922.
2 SHEETS—SHEET 2.

Inventor
Charles P. Skublin
By L. E. Thomas
Attorney

Witness

UNITED STATES PATENT OFFICE.

CHARLES P. SKUBLIN, OF DETROIT, MICHIGAN.

DIFFERENTIAL DRIVE FOR MOTOR VEHICLES.

1,408,835.   Specification of Letters Patent.   Patented Mar. 7, 1922.

Application filed January 24, 1921. Serial No. 439,358.

*To all whom it may concern:*

Be it known that I, CHARLES P. SKUBLIN, citizen of Russia, residing at Detroit, county of Wayne, State of Michigan, have invented a certain new and useful Improvement in Differential Drives for Motor Vehicles, and declare the following to be a full, clear, and exact description of the same, such as will enable others skilled in the art to which it pertains to make and use the same, reference being had to the accompanying drawings, which form a part of this specification.

My invention relates to a differential driving mechanism for motor driven vehicles shown in the accompanying drawings and more particularly described in the following specification and claims.

The primary object of this invention is to provide a simple and inexpensive device comprising two spiral grooved hubs attached to the inner ends of the rear axle of a motor driven vehicle which are adapted to coact with a laterally movable sleeve having a square or rectangular shaped outer wall housed in a correspondingly shaped socket member to which the usual ring-gear actuated by the driving pinion of the propeller shaft of the prime mover is bolted. The invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a horizontal cross-sectional view through the differential housing showing a fragment of the divided axle of a motor driven vehicle (not shown) and the propeller shaft.

Figure 2 is a cross-sectional view taken on or about line 2—2 of Figure 1.

Referring now to the letters of reference placed upon the drawings:

A, indicates the propeller shaft of a prime mover of a motor driven vehicle, extending into a divided casing B, of a differential housing. C, denotes a driving pinion secured to the end of the propeller shaft.

D, designates the usual ring-gear in mesh with the pinion and bolted to the flange $E'$ of a squared socket member E, sleeved upon the divided rear axle F of a motor driven vehicle, said axle extending transversely through the wall of the differential housing.

$E^2$ is a cover plate bolted to the wall of the socket member and having a hub portion $E^3$ through which the axle F projects.

G, G, denote a pair of laterally movable sleeves bolted together at the corners to form a single unit, provided with a squared or rectangular shaped outer wall corresponding with that of the socket member E, in which it is housed.

The bore in each sleeve is formed with one or more spiral ribs $g$ adapted to co-act with correspondingly directed co-acting spiral grooves $h$, formed in a pair of hubs H, H,—respectively secured by keys I, I, to the inner ends of the divided axle.

The hubs H, H, are spaced apart to receive between them a pair of rings J, J,— which are secured to the axle by annular split keys K, lodged in an internal groove in the hub $H'$ and a peripheral groove in the axle.

L, is an annular collar preferably formed of fiber located between the rings J, J,— the periphery of the collar and rings being above the plane of the grooves in the adjacent hubs to limit the lateral movement of the sleeve G.

Figure 4:
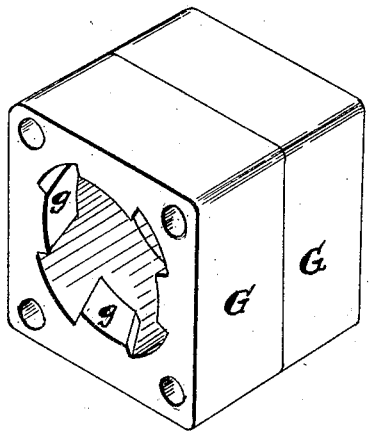
Figure 4 is a perspective view of a pair of laterally movable, spirally grooved sleeves bolted together to form a single unit, slidably housed in the socket member shown in the preceding view.
Figure 5:
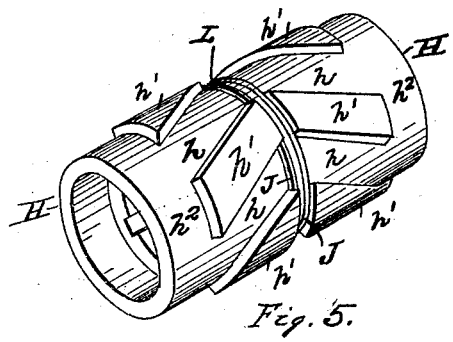
Figure 5 is a perspective view of a pair of spirally ribbed hubs respectively keyed to the inner ends of the divided rear axle, but spaced apart to receive a pair of collars keyed to the shaft and an annular ring.
Figure 6:
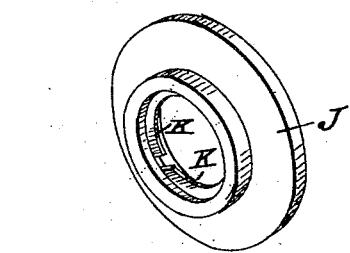
Figure 6 is a perspective view of one of the collars and a divided annular key for securing the collar to the axle.
Figure 3:
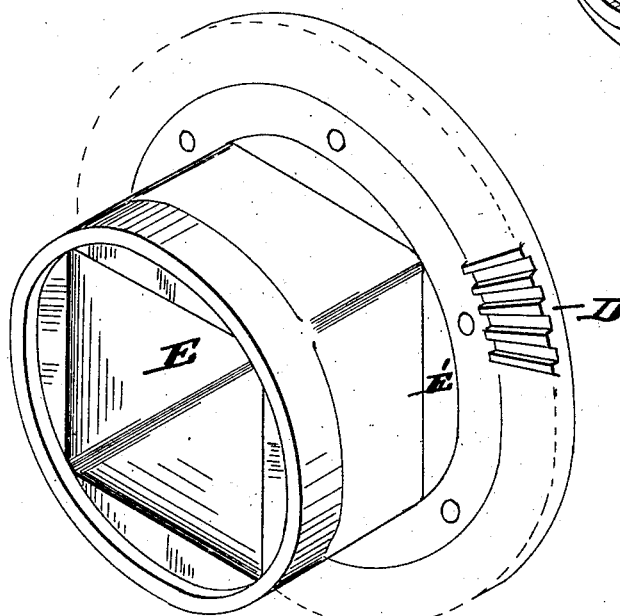
Figure 3 is a perspective view of the squared socket member carried by the ring-gear—in mesh with the driving pinion of the propeller shaft.

It will be noted upon reference to Figure 5 that the spiral ribs $h'$ are cut away at the outer end of the hubs H, to form a peripheral channel $h^2$ connected with the spiral peripheral grooves $h$, in order that when the sleeve G is shifted to the right or left due to a change in the direction taken by the vehicle, the ribs $g$, on the sleeve may enter the peripheral groove $h$ at the end of the hub on the side on which the vehicle turns thereby releasing said hub from driving connection with that portion of the axle carrying the pivot wheel.

Lodged in the counterbores, provided at each corner and on opposite sides of the laterally movable sleeve for the bolts which connect the parts of the sleeve together to form a single unit, are springs M, the outer ends of which bear against the walls of the socket member E, and its cover plate $E^2$, the purpose of the springs being to normally maintain the sleeve in its central or medial position with respect to the wall and cover of the socket member.

Having now indicated the several parts by reference letters the construction and operation of the device will be readily understood:

For the purpose of this description it may be assumed that the driver is about to turn the vehicle to the left (the action however of the parts will be the same though in a reverse direction whether the vehicle is turned to the right or left) whereupon the traction wheels tend to turn at different speeds;—that on the left hand side of the vehicle turning more slowly than the traction wheel on the right hand side. The right hand traction wheel being urged forward at the usual speed—due to the action of the spirally grooved hub H—will force the laterally movable sleeve G to the left that its spiral ribs $g$ may enter the peripheral path at the edge of the left hand hub H to release the left hand wheel from driving connection with the prime mover (not shown) until the steering wheel is again shifted to direct the vehicle ahead, or in an opposite direction to that just taken;— whereupon the sleeve G will be forced to the right thereby releasing the right hand traction wheel from driving connection with the prime mover in a similar manner to that just described. Upon the steering wheel being shifted to drive the vehicle in a forward direction, the springs M (held under compression by the movement of the sleeve F) will operate to return the sleeve to its central or medial position between the wall and cover plate of the socket member. When the vehicle is turned either to the right or left, the lateral movement of the sleeve is limited by the outwardly projecting collars J, keyed to the adjacent ends of the axle.

While the drawing shows the hub and laterally movable sleeve formed with four spiral ribs and co-acting recesses, I prefer that only two ribs be employed, thereby simplifying the construction and reducing the cost of manufacture. The hubs through their connecting co-operating elements serve as equalizers to apply the driving power to either or both of the traction wheels of the vehicle as may be required.

Having thus described my invention what I claim is:

1. In a device of the character described, a divided axle, a pair of hubs secured to the adjacent ends of the divided axle provided with spiral grooves respectively extending in opposite directions and connecting with a peripheral channel at the outer end of each hub, a laterally movable divided sleeve having a rectangular shaped outer wall and a bore provided with relatively short spiral ribs adapted to co-act with the spiral grooves of the respective hubs, a rectangular-shaped socket member adapted to receive and act upon said sleeve, and means for rotating the socket member.

2. In a device of the character described, a divided axle, a pair of hubs secured to the adjacent ends of the divided axle provided with spiral grooves respectively extending in opposite directions and connecting with a peripheral channel at the outer end of each hub, a laterally movable divided sleeve, having a rectangular-shaped outer wall and a bore provided with relatively short spiral ribs adapted to co-act with the spiral grooves of the respective hubs, a rectangular shaped socket member, adapted to receive and act upon said sleeve, a ring-gear bolted to the socket member, a propeller shaft, and a pinion secured to the propeller shaft in mesh with the ring-gear.

3. In a device of the character described, a divided axle, a pair of hubs secured to the adjacent ends of the divided axle provided with spiral grooves respectively extending in opposite directions and connecting with a peripheral channel at the outer end of each hub, a laterally movable divided sleeve having a rectangular shaped outer wall and a bore provided with relatively short spiral ribs adapted to co-act with the spiral grooves of the respective hubs, a rectangular-shaped socket member adapted to receive and act upon said sleeve, a cover bolted to the socket member, springs lodged in said socket member on opposite sides of the sleeve to normally maintain the sleeve in a central medial position within the socket member, and means for rotating the socket member.

4. In a device of the character described, a divided axle, a pair of hubs secured to the adjacent ends of the divided axle having spiral grooves respectively extending in opposite directions and connecting with a peripheral channel at the outer end of each hub, laterally movable sleeve sections having a squared outer wall bolted together to form a single unit, each section of the sleeve having relatively short ribs adapted to co-act with the spiral grooves of the respective co-acting hubs, a squared socket member adapted to house said sleeve unit whereby it may slide laterally therein, rings keyed to the adjacent ends of the axle to limit the lateral movement of the sleeve, a ring-gear bolted to said socket member, a propeller shaft, and a pinion attached to the propeller shaft in mesh with the ring-gear.

In testimony whereof, I sign this specification in the presence of two witnesses.

CHARLES P. SKUBLIN.

Witnesses:
S. E. THOMAS,
CHAS. F. CARNEY.